(12) United States Patent
Kani et al.

(10) Patent No.: US 10,481,853 B2
(45) Date of Patent: Nov. 19, 2019

(54) INFORMATION PROCESSING APPARATUS, INFORMATION PROCESSING SYSTEM, AND INFORMATION PROCESSING METHOD

(71) Applicant: FUJITSU LIMITED, Kawasaki-shi, Kanagawa (JP)

(72) Inventors: Junya Kani, Kawasaki (JP); Hideto Kihara, Kawasaki (JP); Junichi Yura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/937,383

(22) Filed: Mar. 27, 2018

(65) Prior Publication Data
US 2018/0285055 A1      Oct. 4, 2018

(30) Foreign Application Priority Data
Mar. 31, 2017    (JP) .................. 2017-071536

(51) Int. Cl.
*G06F 3/14*    (2006.01)
*G09G 5/00*    (2006.01)

(52) U.S. Cl.
CPC .......... *G06F 3/1462* (2013.01); *G09G 5/005* (2013.01); *G09G 2340/0407* (2013.01)

(58) Field of Classification Search
CPC ..... G06F 3/1462; G06F 3/1407; G09G 5/005; G09G 2380/10; G09G 2370/02; G09G 2320/106; G09G 2340/0407
See application file for complete search history.

(56) References Cited

U.S. PATENT DOCUMENTS

| | | | |
|---|---|---|---|
| 6,556,724 B1 * | 4/2003 | Chang ................... | G06F 3/1454 345/1.2 |
| 8,941,714 B2 * | 1/2015 | Kurakagi ............... | H04N 7/147 348/14.12 |
| 2003/0206193 A1 | 11/2003 | Sato et al. | |
| 2017/0201689 A1 * | 7/2017 | Zilberman ....... | H04N 21/21805 |

FOREIGN PATENT DOCUMENTS

| JP | 5-206959 | 8/1993 |
|---|---|---|
| JP | 2004-5582 | 1/2004 |

* cited by examiner

*Primary Examiner* — Koosha Sharifi-Tafreshi
(74) *Attorney, Agent, or Firm* — Fujitsu Patent Center

(57) ABSTRACT

An information processing method executed by an information processing apparatus which transmits data to a different information processing apparatus, the method includes: receiving a granularity capable of expressing a change of the data in the different information processing apparatus; and when the data changes, transmitting the data after change to the different information processing apparatus according to the granularity received in the receiving and an extent of the change of the data.

12 Claims, 14 Drawing Sheets

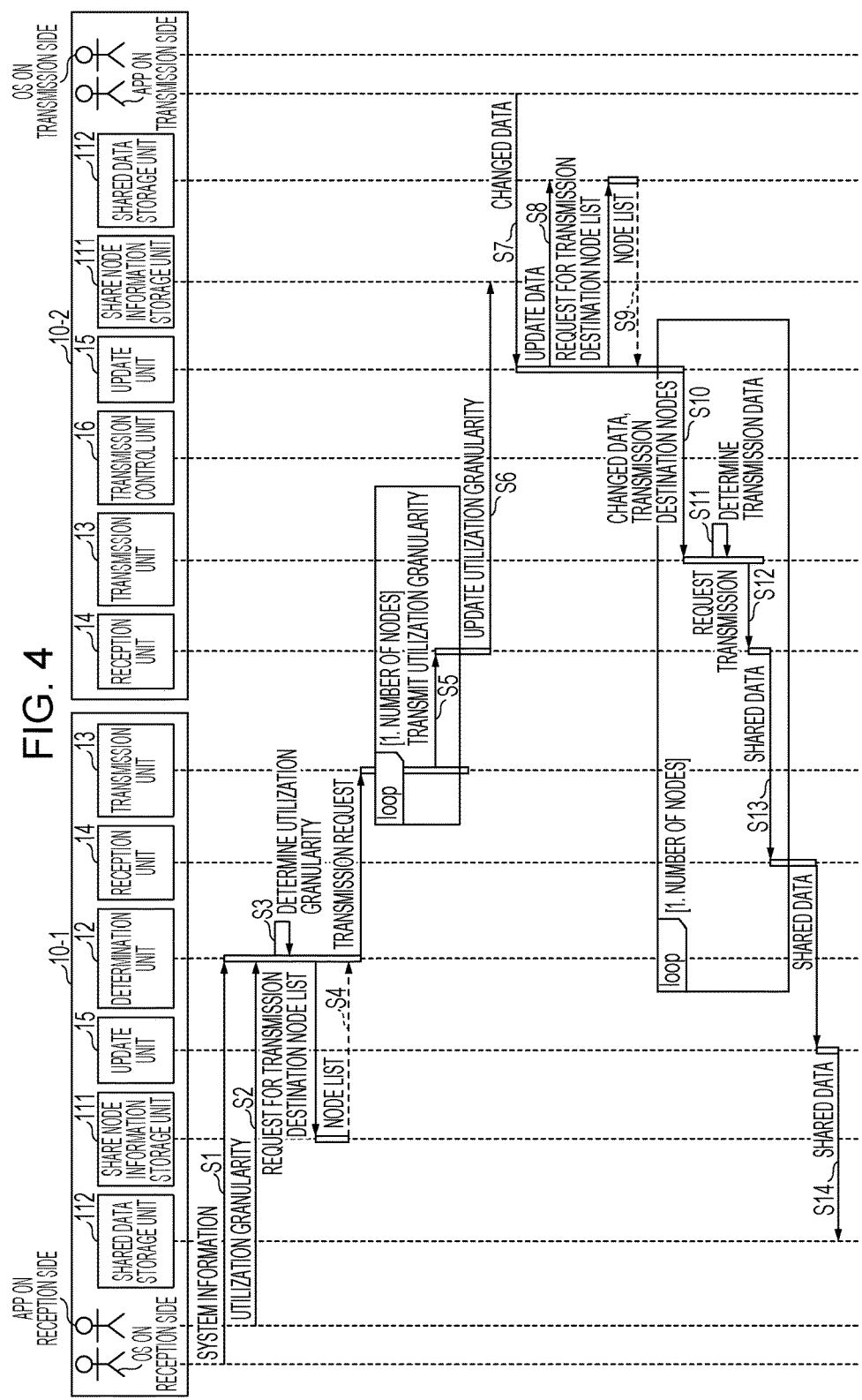

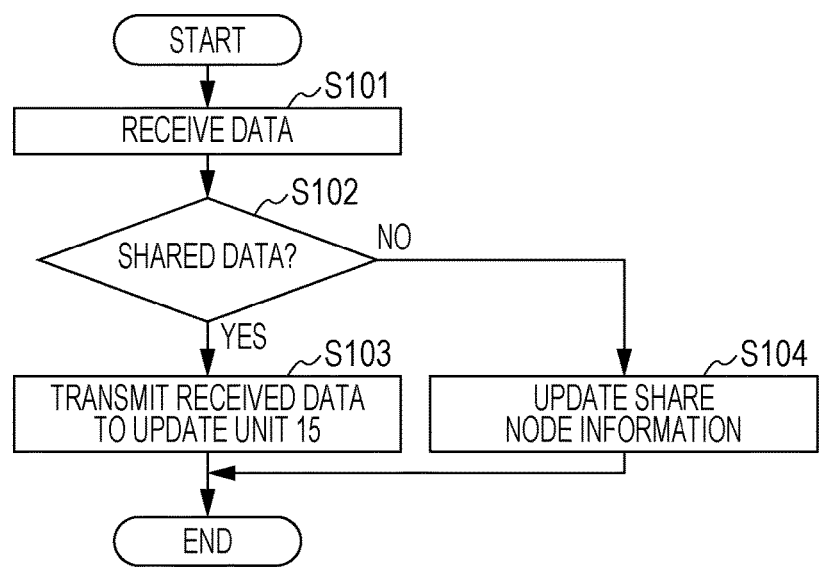

INFORMATION PROCESSING APPARATUS, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2017-71536, filed on Mar. 31, 2017, the entire contents of which are incorporated herein by reference.

FIELD

The embodiments discussed herein are related to an information processing apparatus, an information processing system, and an information processing method.

BACKGROUND

A system is conventionally known that enables multiple terminals to share information such as a desktop screen. For example, in the case of causing a terminal to display PC screen information, a technique is known which does not display the entire PC screen on the terminal but trims the image in a size of the screen of the terminal and displays the trimmed image on the terminal (for example, see Japanese Laid-open Patent Publication No. 2004-005582). Related techniques are also disclosed in, for example, Japanese Laid-open Patent Publication No. 05-206959.

However, the conventional technique has a problem that unnecessary communications take place in the case of a change in information shared by the terminals because the change is so slight that one of the terminals is not capable of expressing the change.

In view of the above, an aspect aims to provide a technique which enables efficient data transmission.

SUMMARY

According to an aspect of the invention, an information processing method executed by an information processing apparatus which transmits data to a different information processing apparatus, the method includes: receiving a granularity capable of expressing a change of the data in the different information processing apparatus; and when the data changes, transmitting the data after change to the different information processing apparatus according to the granularity received in the receiving and an extent of the change of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a sequence diagram illustrating an example of processing by the information processing system according to the embodiment;

FIG. 6 is a diagram illustrating an example of data stored in a shared data storage unit;

FIG. 7 is a flowchart illustrating an example of processing by a reception unit;

DESCRIPTION OF EMBODIMENTS

Figure 1:
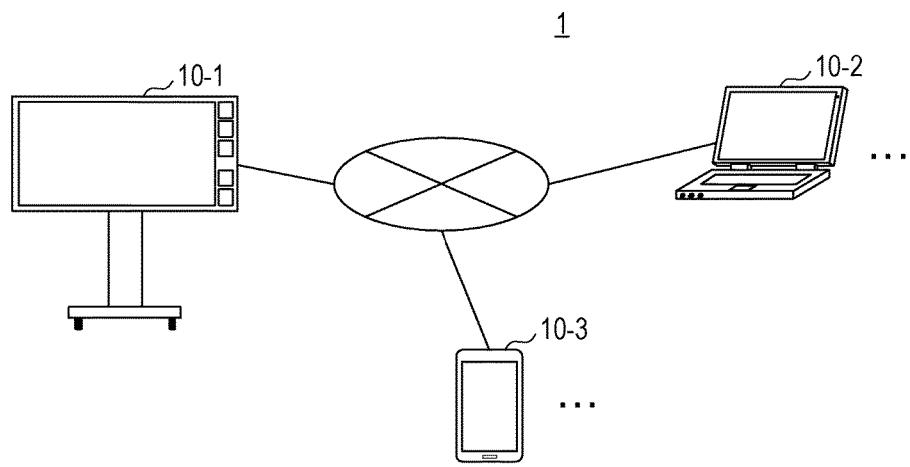
FIG. 1 is a diagram illustrating a configuration example of an information processing system according to an embodiment.

Hereinafter, embodiments of the disclosure are described based on the drawings. FIG. 1 is a diagram illustrating a configuration example of an information processing system 1 according to an embodiment. In FIG. 1, the information processing system 1 includes information processing apparatuses 10-1, 10-2, and 10-3 (simply referred to as an "information processing apparatus 10" or "information processing apparatuses 10" in the following description in the case where it is unnecessary to make a distinguishment among them).

Note that in the following description, in the information processing system 1, an example of sharing information is described by use of allowing a relatively small screen of the user's smartphone or of a screen embedded in a desk to display a screen depicting the manipulation of a relatively large screen embedded in a wall, for example.

The information processing apparatuses 10-1, 10-2, and 10-3 are communicably connected to one another by a communication network such as a local area network (LAN) or the Internet. Although only three information processing apparatuses 10 are shown in FIG. 1, the information processing system 1 is not limited to three information processing apparatuses 10.

The information processing apparatus 10 is, for example, a personal computer (PC), a tablet type terminal, a smartphone, an electronic whiteboard, and the like. The screen of the information processing apparatus 10 may be embedded in, for example, a wall or a desk.

Figure 2:
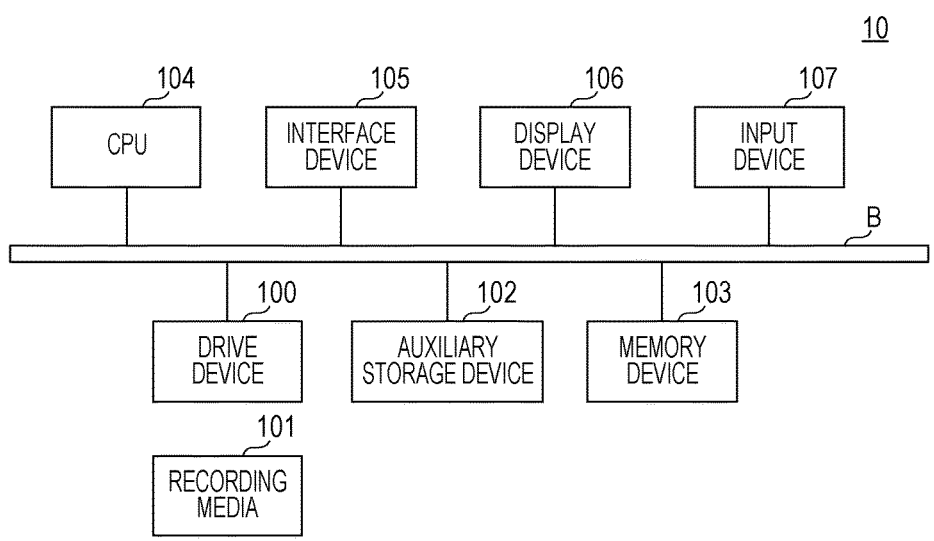
FIG. 2 is a diagram illustrating a hardware configuration example of an information processing apparatus according to the embodiment.

FIG. 2 is a diagram illustrating a hardware configuration example of the information processing apparatus 10 according to the embodiment. The information processing apparatus 10 of FIG. 2 includes a drive device 100, an auxiliary storage device 102, a memory device 103, a CPU 104, an interface device 105, a display device 106, an input device 107, and the like, all of which are connected via a bus B.

An information processing program which enables processing in the information processing apparatus 10 is provided by a recording media 101. When the recording media 101 having the information processing program is set in the drive device 100, the information processing program is installed from the recording media 101 through the drive device 100 to the auxiliary storage device 102. Note that the information processing program does not necessarily have to be installed using the recording media 101 but may instead be downloaded from another computer via a network. The auxiliary storage device 102 stores the installed information processing program and also stores desired files, data, and the like.

The memory device 103 reads the program from the auxiliary storage device 102 and stores the program therein when it receives an instruction to activate the program. The CPU 104 executes the functions of the information processing apparatus 10 in accordance with the program stored in the memory device 103. The interface device 105 is used as an interface to connect to the network. The display device 106 displays a graphical user interface (GUI) and the like by the program. The input device 107 includes a touch panel, buttons, and the like and is used to enable inputting of various manipulation instructions.

Note that examples of the recording media 101 include a portable recording media such as a CD-ROM, a DVD disk, or a USB memory. Also, examples of the auxiliary storage device 102 include a hard disk drive (HDD), a flash memory, and the like. Each of the recording media 101 and the auxiliary storage device 102 is a computer-readable recording media.

[First Embodiment]
<Functional Configuration>

Figure 3:
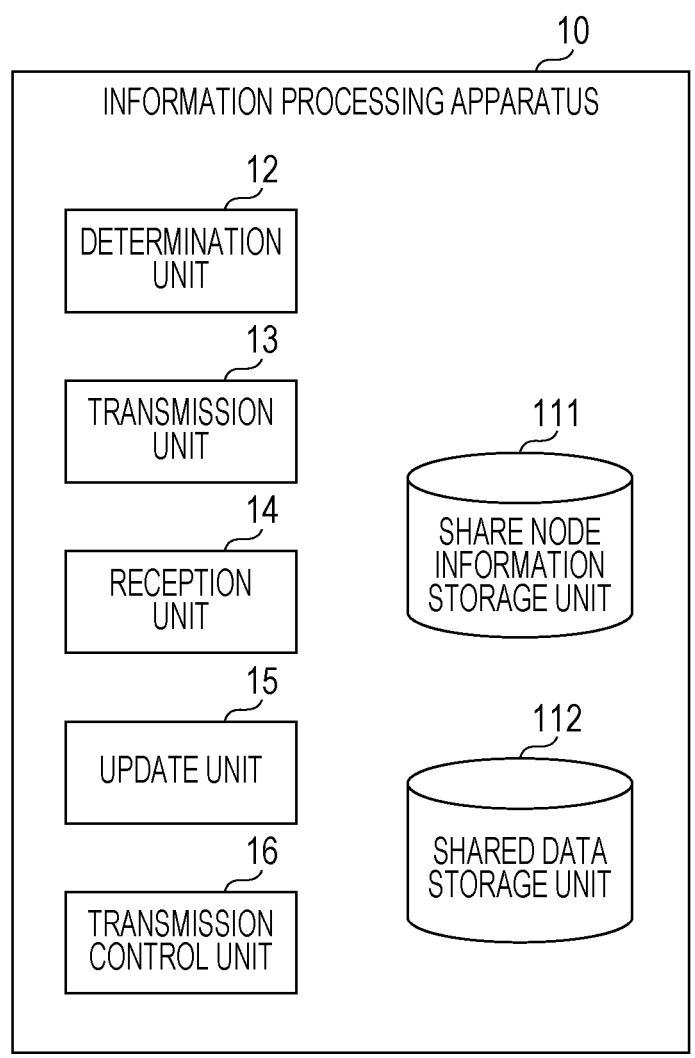
FIG. 3 is a diagram illustrating an example of a functional block diagram of an information processing apparatus according to a first embodiment.

Next, with reference to FIG. 3, a functional configuration of the information processing apparatus 10 is described. FIG. 3 is a diagram illustrating an example of a functional block diagram of the information processing apparatus 10 according to a first embodiment. The information processing apparatus 10 includes a determination unit 12, a transmission unit 13, a reception unit 14, an update unit 15, and a transmission control unit 16. These units function when one or more programs installed in the information processing apparatus 10 cause the CPU 104 of the information processing apparatus 10 to execute processing.

The determination unit 12 determines a utilization granularity which is a granularity (fineness, precision) capable of expressing a data change on the screen of the information processing apparatus 10.

The transmission unit 13 transmits the utilization granularity determined by the determination unit 12 to other information processing apparatuses 10 sharing the data.

The reception unit 14 receives the utilization granularity, the shared data, and the like in other information processing apparatuses 10.

The update unit 15 updates data to be displayed on the screen based on the shared data.

The transmission control unit 16 transmits the shared data to other information processing apparatuses 10 in consideration of the extent of change of the data and the ratio between the utilization granularity determined by the determination unit 12 and the utilization granularity received by the reception unit 14.

In addition, the information processing apparatus 10 includes a share node information storage unit 111 and a shared data storage unit 112. These storage units function by use of, for example, the auxiliary storage device 102 and the like. In the following, a description is provided on data stored in the share node information storage unit 111 and the shared data storage unit 112.

<Processing>

Next, with reference to FIG. 4, the processing by the information processing system 1 is described. FIG. 4 is a sequence diagram illustrating an example of the processing by the information processing system 1 according to the embodiment.

At step S1, the determination unit 12 of the information processing apparatus 10-1 acquires system information on the information processing apparatus 10-1. Here, for example, information on the screen resolution of the information processing apparatus 10-1 is acquired from the operating system (OS) of the information processing apparatus 10-1.

Subsequently, the determination unit 12 of the information processing apparatus 10-1 acquires utilization granularity from the application of the information processing apparatus 10-1 (step S2). Here, the application of the information processing apparatus 10 has a function to share the screen with other information processing apparatuses 10. In addition, the utilization granularity is the resolution (or any value based on the resolution) of the screen of, for example, the information processing apparatus 10-1 which displays information on the screen to be shared by other information processing apparatuses 10 (e.g., information processing apparatus 10-2, as illustrated in FIG. 4).

Subsequently, the determination unit 12 of the information processing apparatus 10-1 determines the utilization granularity based on at least one of the system information acquired at step S1 and the utilization granularity acquired at step S2 (step S3).

Subsequently, the determination unit 12 of the information processing apparatus 10-1 acquires a list of the apparatuses which share the screen (node list) from the share node information storage unit 111 of the information processing apparatus 10-1 (step S4).

Figure 5A:
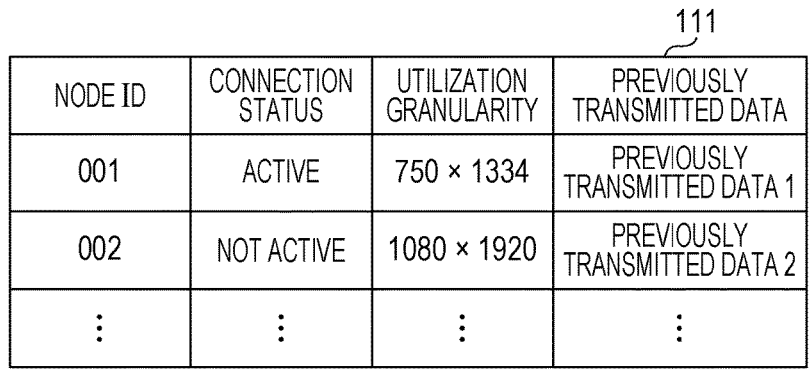
FIG. 5A is a diagram illustrating an example of data stored in a share node information storage unit.

FIG. 5A is a diagram illustrating an example of data stored in the share node information storage unit 111. The share node information storage unit 111 stores connection status, utilization granularity, and previously transmitted data, which are associated with a node ID.

The node ID contains IDs of other information processing apparatuses 10 which share the screen. The connection status is information indicating whether or not each of the information processing apparatuses 10 associated with the corresponding node ID is in a status capable of communications. The connection status is set to "Active" if communications are possible. The utilization granularity is notified by the information processing apparatus 10 associated with the corresponding node ID and indicates the utilization granularity of that information processing apparatus 10. The previously transmitted data indicates data previously transmitted to the information processing apparatus 10 associated with the corresponding node ID.

Subsequently, the determination unit 12 of the information processing apparatus 10-1 transmits the utilization granularity determined at step S3 and the ID of the information processing apparatus 10-1 to other information processing apparatuses 10 (e.g., information processing apparatus 10-2) contained in the node list by use of the transmission unit 13 of the information processing apparatus 10-1 (step S5). Here, the ID of the information processing apparatus 10-1 may be, for example, a communication address such as the MAC address or the IP address of the information processing apparatus 10-1.

Figure 5B:
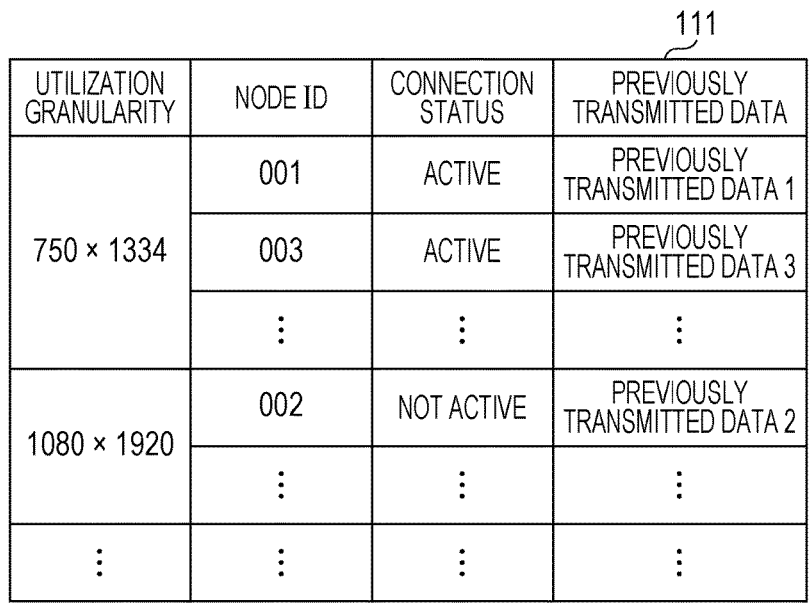
FIG. 5B is a diagram illustrating another example of data stored in a share node information storage unit.

FIG. 5B is a diagram illustrating another example of data stored in the share node information storage unit 111. In FIG. 5B, node IDs are stored associated with a corresponding utilization granularity. Further, the connection status and the previously transmitted data are stored associated with the corresponding node IDs.

Subsequently, the reception unit 14 of the information processing apparatus 10-2 associates the utilization granularity received at step S5 with the ID of the information processing apparatus 10-1 and stores them in the share node information storage unit 111 of the information processing apparatus 10-2 (step S6).

Subsequently, the update unit 15 of the information processing apparatus 10-2 acquires the current shared data which has been changed (changed data) from the application of the information processing apparatus 10-2 (step S7). Here, for example, if the screen shared in the information processing system 1 is changed due to the manipulation by the user of the information processing apparatus 10-2, shared data indicating the screen after the change is acquired.

Subsequently, the update unit 15 of the information processing apparatus 10-2 updates information on the screen shared in the information processing system 1, the information being stored in the shared data storage unit 112 of the information processing apparatus 10-2 (step S8). Thus, the screen of the information processing apparatus 10-2 displays a shared screen after the update.

FIG. 6 is a diagram illustrating an example of data stored in the shared data storage unit 112. The shared data storage unit 112 stores shared data associated with a data ID.

The data ID is an ID of data to be shared. The shared data is the content of data to be shared. The shared data contains data indicating the positions and the sizes of the windows in the desktop screen to be shared such as the coordinates of the lower left corner and the upper right corner of each window.

Subsequently, the update unit 15 of the information processing apparatus 10-2 acquires a list of the apparatuses which share the screen (node list) from the share node information storage unit 111 of the information processing apparatus 10-2 (step S9).

Subsequently, the update unit 15 of the information processing apparatus 10-2 transmits the shared data acquired at step S7 and the node list acquired at step S9 to the transmission control unit 16 of the information processing apparatus 10-2 (step S10).

Subsequently, the transmission control unit 16 of the information processing apparatus 10-2 refers to the share node information storage unit 111 and determines the shared data to be transmitted to the other information processing apparatuses 10 (e.g., information processing apparatus 10-1) contained in the node list (step S11).

Subsequently, the transmission control unit 16 of the information processing apparatus 10-2 uses the transmission unit 13 of the information processing apparatus 10-2 and transmits the shared data determined according to each of the other information processing apparatuses 10 to the other information processing apparatuses 10 (e.g., information processing apparatus 10-1) (step S12). Note that the transmission unit 13 may transmit identical shared data simultaneously to multiple information processing apparatuses 10 with the same utilization granularity by multicast and the like.

Subsequently, the reception unit 14 of the information processing apparatus 10-1 receives the shared data transmitted to the information processing apparatus 10-1 and transmits the shared data to the update unit 15 of the information processing apparatus 10-1 (step S13).

Subsequently, based on the received shared data, the update unit 15 of the information processing apparatus 10-1 updates information on the screen shared in the information processing system 1, the information being stored in the shared data storage unit 112 of the information processing apparatus 10-1 (step S14). Thus, the screen of the information processing apparatus 10-1 displays a shared screen after the update.

<Modified Example>

Each of the information processing apparatuses 10 may be configured to share more than one type of data. For example, data on more than one screen may be shared. In this case, the determination unit 12 may determine the utilization granularity for each type of data to be shared, and the share node information storage unit 111 and the shared data storage unit 112 may be provided such that the number of the pairs thereof is equal to the number of the types of data to be shared. In addition, in this case, the processing by the reception unit 14 may be set for each type of data to be shared by dividing the reception port of the reception unit 14 corresponding to the types of data to be shared and by setting a callback function and the like for each reception port.

<<Processing by Reception Unit 14>>

Next, with reference to FIG. 7, the processing by the reception unit 14 at steps S6 and S13 is described. FIG. 7 is a flowchart illustrating an example of the processing by the reception unit 14.

At step S101, the reception unit 14 receives data with the interface device 105.

Subsequently, the reception unit 14 determines whether or not the received data is the shared data (step S102).

If the received data is the shared data (YES at step S102), the received shared data is transmitted to the update unit 15 (step S103) and the processing is terminated.

If the received data is not the shared data (NO at step S102), the received data is stored in the share node information storage unit 111 (step S104), and the processing is terminated.

<<Processing by Update Unit 15>>

Figure 8:
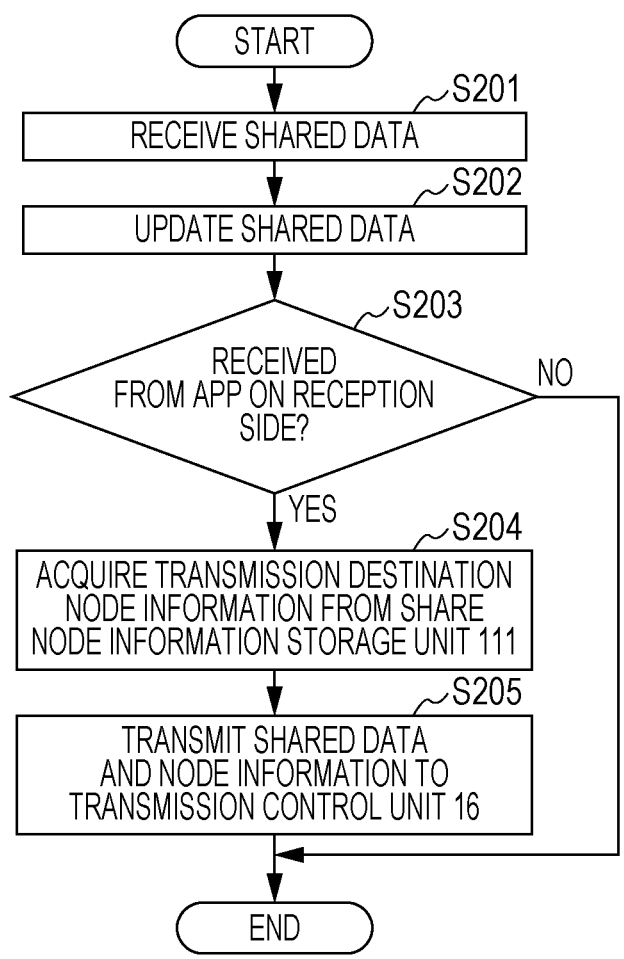
FIG. 8 is a flowchart illustrating an example of processing by an update unit.

Next, with reference to FIG. 8, a description is provided for the processing by the update unit 15 at steps S7 to S10 and step S14. FIG. 8 is a flowchart illustrating an example of the processing by the update unit 15. Although the description is provided for the processing by the update unit 15 of the information processing apparatus 10-1 in the following description, the processing of the update unit 15 of other information processing apparatuses 10 (e.g., information processing apparatus 10-2) may be the same.

At step S201, the update unit 15 of the information processing apparatus 10-1 receives the shared data.

Subsequently, the update unit 15 of the information processing apparatus 10-1 updates information on the screen shared in the information processing system 1 which is stored in the shared data storage unit 112 (step S202).

Subsequently, the update unit 15 of the information processing apparatus 10-1 determines whether or not the shared data received at step S201 is data received from the application of the information processing apparatus 10-1 (step S203).

If the data is not data received from the application of the information processing apparatus 10-1 (NO at step S203), the processing is terminated.

If the data is data received from the application of the information processing apparatus 10-1 (YES at step S203), the update unit 15 of the information processing apparatus 10-1 acquires a list of the apparatuses which share the screen (node list) from the share node information storage unit 111 of the information processing apparatus 10-1 (step S204).

Subsequently, the update unit 15 of the information processing apparatus 10-1 transmits the shared data acquired at step S201 and the node list acquired at step S204 to the transmission control unit 16 (step S205), and the processing is terminated.

<<Processing by Transmission Control Unit 16>>

Figure 9:
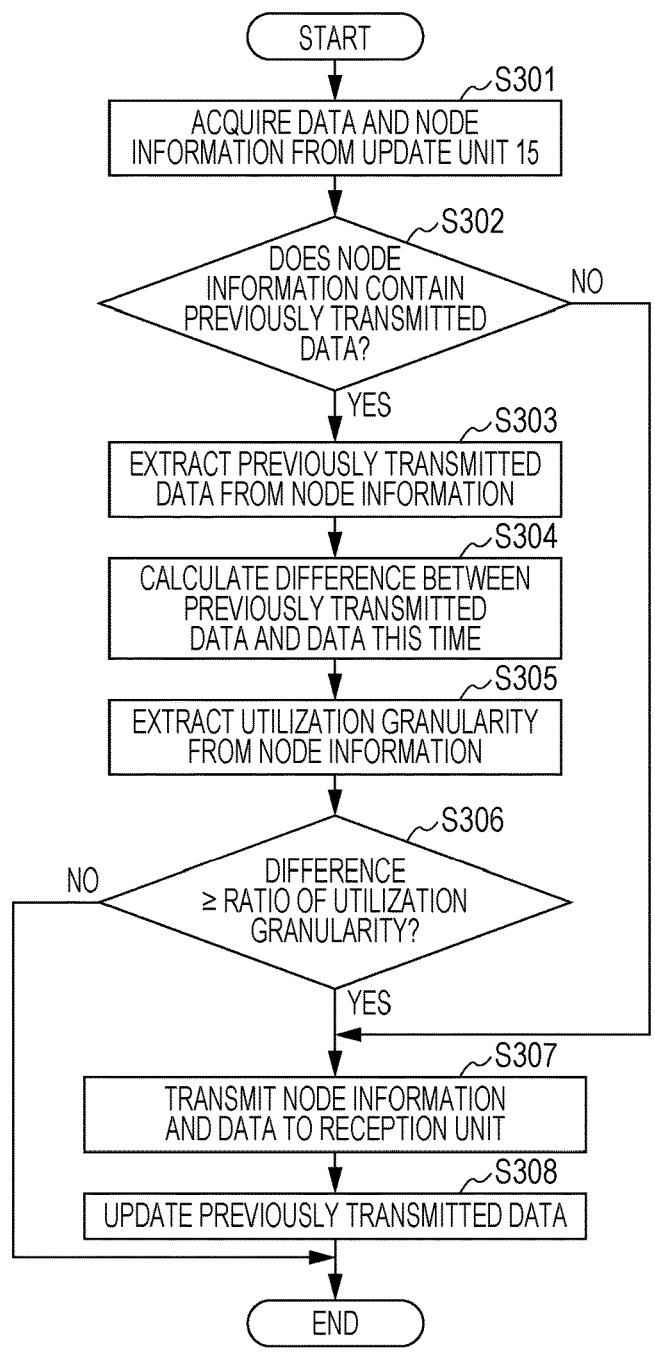
FIG. 9 is a flowchart illustrating an example of processing by a transmission control unit.

Next, with reference to FIG. 9, a description is provided for the processing by the transmission control unit 16 at steps S11 and S12. FIG. 9 is a flowchart illustrating an example of the processing by the transmission control unit 16.

At step S301, the transmission control unit 16 acquires the shared data and the node list from the update unit 15.

In the following description, a description is provided for the processing performed on one of the information processing apparatuses 10 contained in the node list (hereinafter referred to as the "information processing apparatus 10 to be processed"). For this reason, the following processing is executed on each of the information processing apparatuses 10 contained in the node list.

Subsequently, the transmission control unit 16 determines whether or not the previously transmitted data is stored in the share node information storage unit 111 in a manner associated to the information processing apparatus 10 to be processed (step S302).

If the previously transmitted data is not stored (NO at step S302), the processing advances to the processing at step S307 to be described later.

If the previously transmitted data is stored (YES at step S302), the transmission control unit 16 acquires the previously transmitted data associated with the information processing apparatus 10 to be processed from the share node information storage unit 111 (step S303).

Subsequently, the transmission control unit 16 calculates the difference between the previously transmitted data and the changed data being the current shared data (step S304). Here, for example, calculated is the difference between the position of a particular window in the previously transmitted data and the position of the particular window in the changed data.

Subsequently, the transmission control unit 16 acquires the utilization granularity associated with the information processing apparatus 10 to be processed from the share node information storage unit 111 (step S305).

Subsequently, the transmission control unit 16 determines whether or not the difference calculated at step S304 is equal to or more than the value of the ratio of the utilization granularity associated with the information processing apparatus 10 to be processed to the utilization granularity determined by the determination unit 12 at step S3 (step S306). Here, if the utilization granularity associated with the information processing apparatus 10 to be processed is 2560×1440 pixels and the utilization granularity of the information processing apparatus 10-1 under consideration is 5120×2880, the value of the ratio is "2" for both vertically (2880/1440) and horizontally (5120/2560).

If the difference is less than the value of the ratio (NO at step S306), the processing is terminated.

If the difference is equal to or more than the value of the ratio (YES at step S306), the transmission control unit 16 transmits the changed data to the information processing apparatus 10 to be processed using the transmission unit 13 (step S307).

Here, with reference to FIGS. 10A to 11B, a description is provided for the processing in which the transmission control unit 16 transmits the changed data based on the utilization granularity.

Figure 10A:
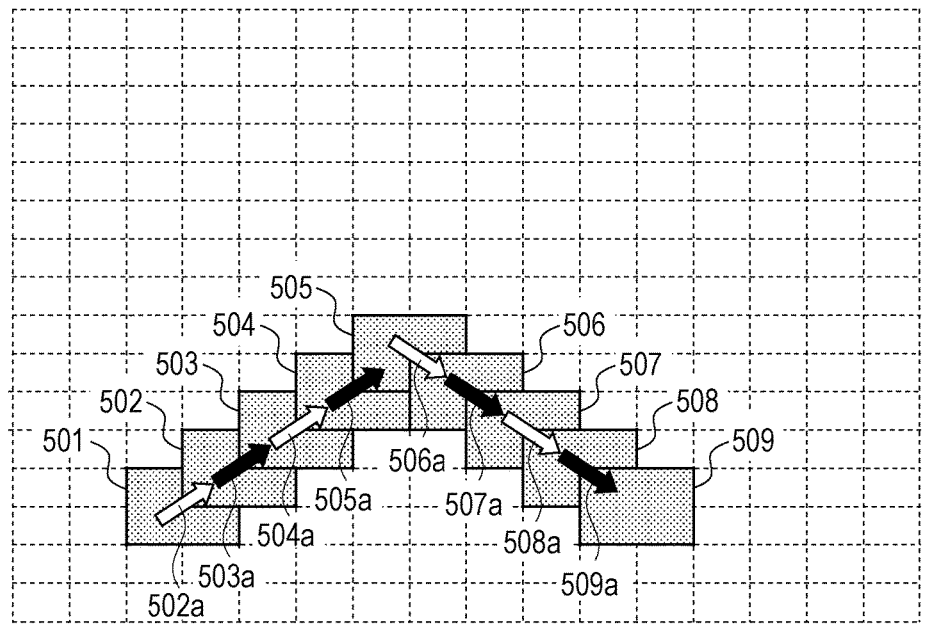
FIGS. 10A and 10B are diagrams explaining an example of processing in which the transmission control unit gets rid of changed data and transmits the resultant data.
Figure 10B:
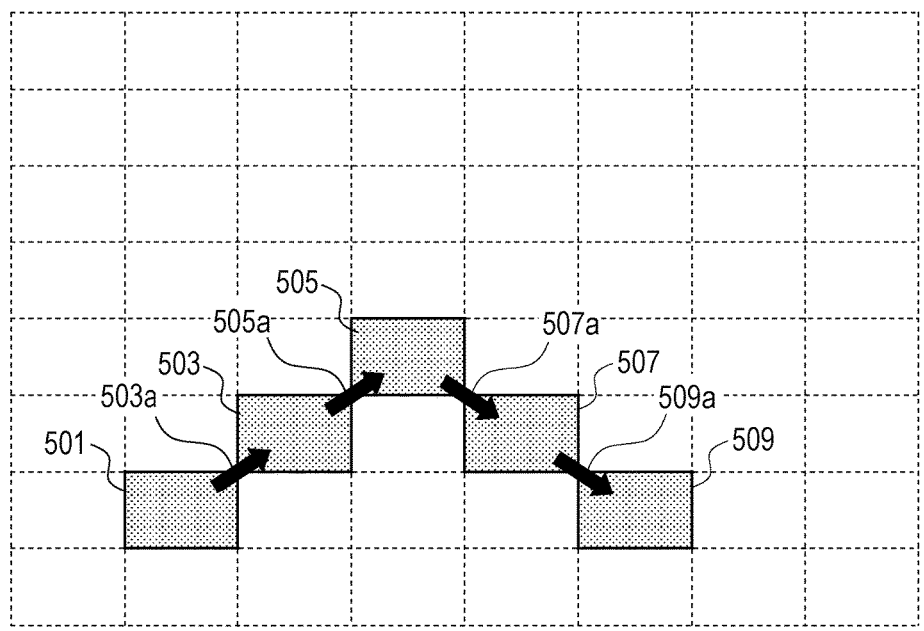

FIGS. 10A and 10B are diagrams explaining an example of the processing in which the transmission control unit 16 gets rid of changed data and transmits the resultant data. Suppose, for example, in the information processing apparatus 10-1, the user has moved a particular window by 30 pixels for 1 second at a fixed speed. In the case where the application of the information processing apparatus 10-1 samples the change in the screen at 30 frames per second (fps), 30 sets of shared data each representing the particular window are generated, where adjacent two of them has a difference corresponding to 1 pixel.

In this case, if the vertical and the horizontal resolutions of the information processing apparatus 10-2 sharing the screen are half those of the information processing apparatus 10-1, the value of the ratio of utilization granularity is "2" pixels. For this reason, the transmission control unit 16 of the information processing apparatus 10-1 does not transmit the changed data if the difference between the previously transmitted data and the changed data is less than 2 pixels.

In this case, the changed data is transmitted to the information processing apparatus 10-2 if the difference between the previously transmitted data and the changed data is equal to or more than 2 pixels. In this case, when the position of the particular window in the information processing apparatus 10-1 changes from 501 to 509 along arrows 502a to 509a as illustrated in FIG. 10A, the position of the particular window in the information processing apparatus 10-2 changes as positions 501, 503, 505, 507, and 509 along arrows 503a, 505a, 507a, and 509a, as illustrated in FIG. 10B.

This makes it possible to omit unnecessary communications because the changed data at positions 502, 504, 506, and 508 is got rid of and is not transmitted and received, which does not change its appearance in the information processing apparatus 10-2 due to limitations such as resolution.

Figure 11A:
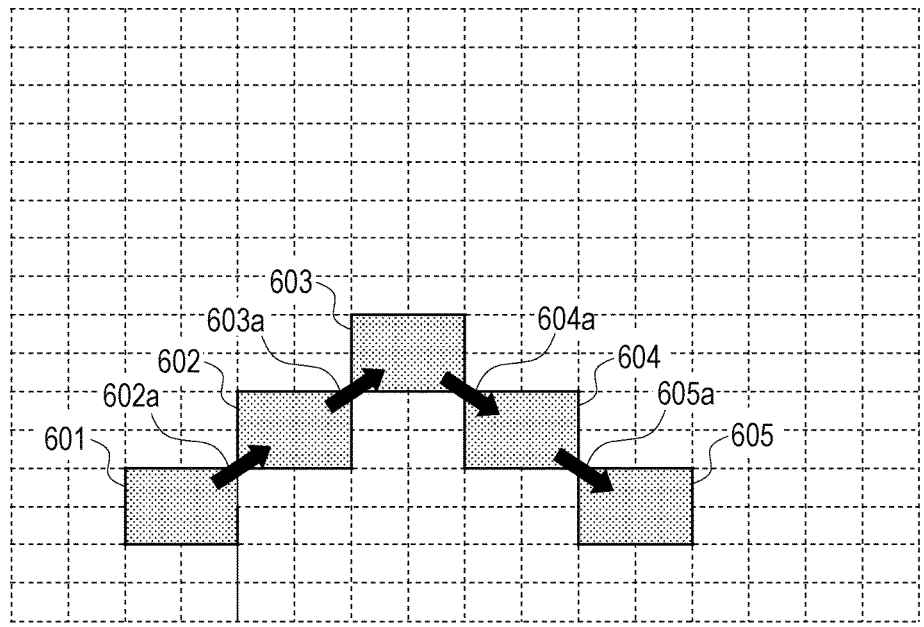
FIGS. 11A and 11B are diagrams explaining an example of processing in which the transmission control unit does not get rid of changed data and transmits the whole data.
Figure 11B:
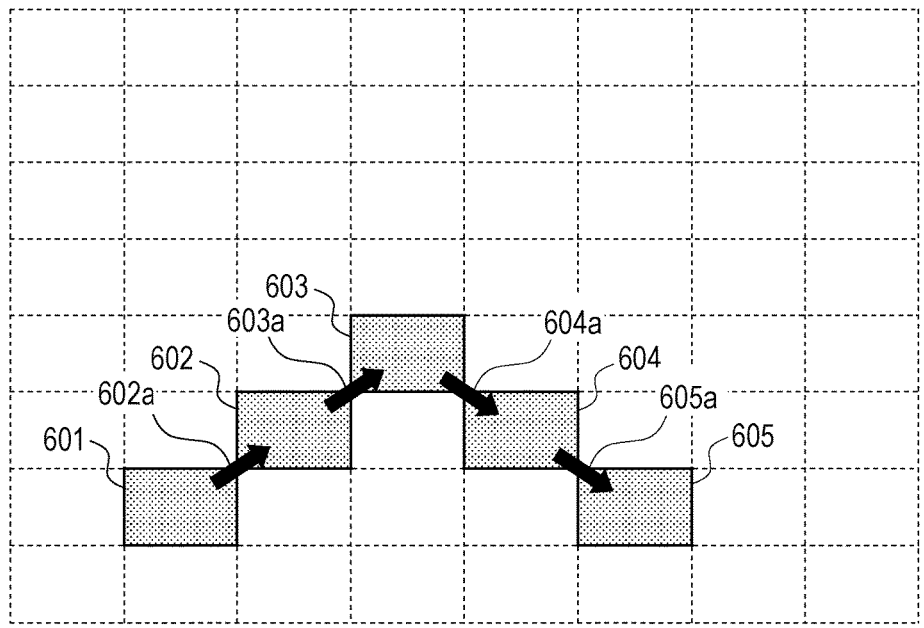

FIGS. 11A and 11B are diagrams explaining an example of the processing in which the transmission control unit 16 does not get rid of the changed data and transmits the whole data. Suppose, for example, in the information processing apparatus 10-1, the user has moved a particular window by 30 pixels for 0.5 seconds at a fixed speed. In the case where the application of the information processing apparatus 10-1 samples the change in the screen at 30 frames per second (fps), 15 sets of shared data each representing the particular window are generated, where adjacent two of them has a difference corresponding to 2 pixels.

In this case, if the vertical and the horizontal resolutions of the information processing apparatus 10-2 sharing the screen are half those of the information processing apparatus 10-1, the value of the ratio of utilization granularity is "2" pixels. In this case, when the position of the particular window in the information processing apparatus 10-1 changes from 601 to 605 along arrows 602a to 605a as illustrated in FIG. 11A, the position of the particular window in the information processing apparatus 10-2 also changes from 601 to 605 along arrows 602a to 605a, as illustrated in FIG. 11B.

Thus, the changed data, whose appearance is changed in the information processing apparatus 10-2, is not got rid of and is transmitted and received.

Subsequently, in the share node information storage unit 111, the transmission control unit 16 stores the changed data being the data transmitted this time in the item of the previously transmitted data associated with the information processing apparatus 10 to be processed (step S308). This updates the previously transmitted data associated with the information processing apparatus 10 to be processed to the changed data.

<<Processing by Determination Unit 12>>

Figure 12:
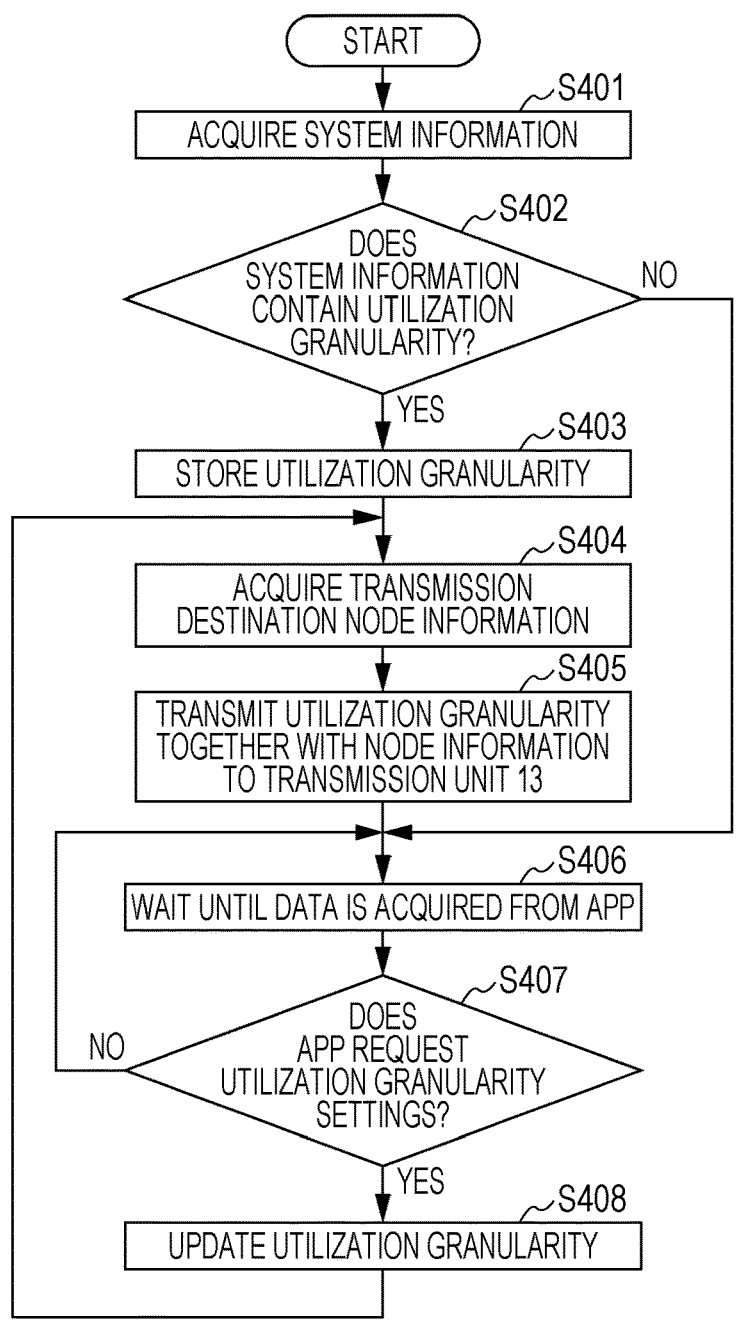
FIG. 12 is a flowchart illustrating an example of processing by a determination unit.

Next, with reference to FIG. 12, a description is provided for the processing by the determination unit 12 at steps S1 to S5. FIG. 12 is a flowchart illustrating an example of the processing by the determination unit 12.

At step S401, the determination unit 12 acquires the system information on the information processing apparatus 10.

Subsequently, the determination unit 12 determines whether or not the system information contains information on utilization granularity (step S402). Here, in the case of sharing the entire screen of the information processing apparatus 10 with other information processing apparatuses 10, it suffices to set the screen resolution contained in the system information as the utilization granularity. Thus, it is determined that the system information contains information on utilization granularity. On the other hand, in the case of sharing a partial region of the screen of the information processing apparatus 10 with other information processing apparatuses 10, for example, it is determined that the system information does not contain information on utilization granularity.

If the system information does not contain information on utilization granularity (NO at step S402), the processing advances to the processing at step S406 to be described later.

If the system information contains information on utilization granularity (YES at step S402), the determination unit 12 stores information on utilization granularity (step S403).

Subsequently, the determination unit 12 acquires a list of the apparatuses which share the screen (node list) from the share node information storage unit 111 (step S404).

Subsequently, the determination unit 12 transmits the utilization granularity to the other information processing apparatuses 10 (e.g., information processing apparatus 10-2) contained in the node list using the transmission unit 13 (step S405).

Subsequently, the determination unit 12 waits until data is acquired from the application of the information processing apparatus 10 (step S406).

Subsequently, the determination unit 12 determines whether or not a utilization granularity setting request is acquired from the application of the information processing apparatus 10 (step S407). Here, the utilization granularity setting request is acquired when, for example, the display of the information processing apparatus 10 is switched between vertical and horizontal.

If the utilization granularity setting request is acquired (YES at step S407), information on the utilization granularity stored at step S403 is updated to the utilization granularity requested by the application of the information processing apparatus 10 (step S408), and the processing advances to the processing at step S404.

If the utilization granularity setting request is not acquired (NO at step S407), the processing advances to the processing at step S406. Note that, for example, the processing at step S406 may continue while the application of the information processing apparatus 10 is active and may be terminated when the application of the information processing apparatus 10 is terminated.

<<Processing by Transmission Unit 13>>

Figure 13:
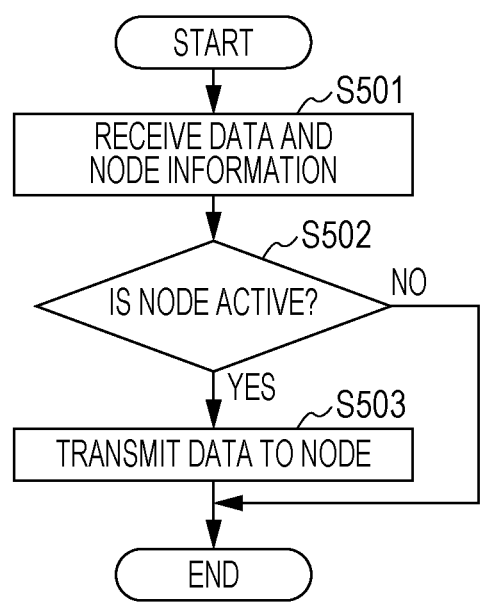
FIG. 13 is a flowchart illustrating an example of processing by a transmission unit.

Next, with reference to FIG. 13, a description is provided for the processing by the transmission unit 13 at steps S5 and S12. FIG. 13 is a flowchart illustrating an example of the processing by the transmission unit 13.

At step S501, the transmission unit 13 receives transmission data and information on the transmission destination nodes from the determination unit 12 or the transmission control unit 16.

Subsequently, the transmission unit 13 refers to the share node information storage unit 111 and determines whether or not the connection status of the node under consideration is Active (capable of communications) (step S502).

If the node is not Active (NO at step S502), the processing is terminated.

If the node is Active (YES at step S502), the transmission unit 13 transmits the data to the node (step S503), and the processing is terminated.

<<Modified Example of Processing by Transmission Control Unit 16>>

Although a description is provided for a modified example of the processing by the transmission control unit 16 of the information processing apparatus 10-1 in the following description, the processing by the transmission control units 16 of the other information processing apparatuses 10 may be the same.

The transmission control unit 16 of the information processing apparatus 10-1 may perform the ridding process at step S306 of FIG. 9 if the load on the network among the information processing apparatuses 10 is equal to or more than a predetermined threshold or if the processing load on the CPU 104 of the information processing apparatus 10-1 configured to transmit shared data is less than a predetermined threshold. To be more specific, if the load on the network among the information processing apparatuses 10 is less than a predetermined threshold or if the processing load on the CPU 104 of the information processing apparatus 10-1 configured to transmit shared data is equal to or more than a predetermined threshold, the ridding processing at step S306 is not performed and all changed data is transmitted. In this case, it suffices that the other information processing apparatuses 10 having received the shared data may discard the shared data unnecessary for display, for example. Note that the load on the network and the processing load on the CPU 104 may be acquired using a known method.

In addition, the transmission control unit 16 of the information processing apparatus 10-1 may be configured to perform further ridding processing compared to the processing of FIG. 9 if the load on the network among the information processing apparatuses 10 is equal to or more than a predetermined threshold or if the processing load on the CPU 104 of the other information processing apparatuses 10 configured to transmit shared data is equal to or more than a predetermined threshold. For example, at step S306, the value of the ratio of utilization granularity may be corrected to an integer multiple.

Figure 14A:
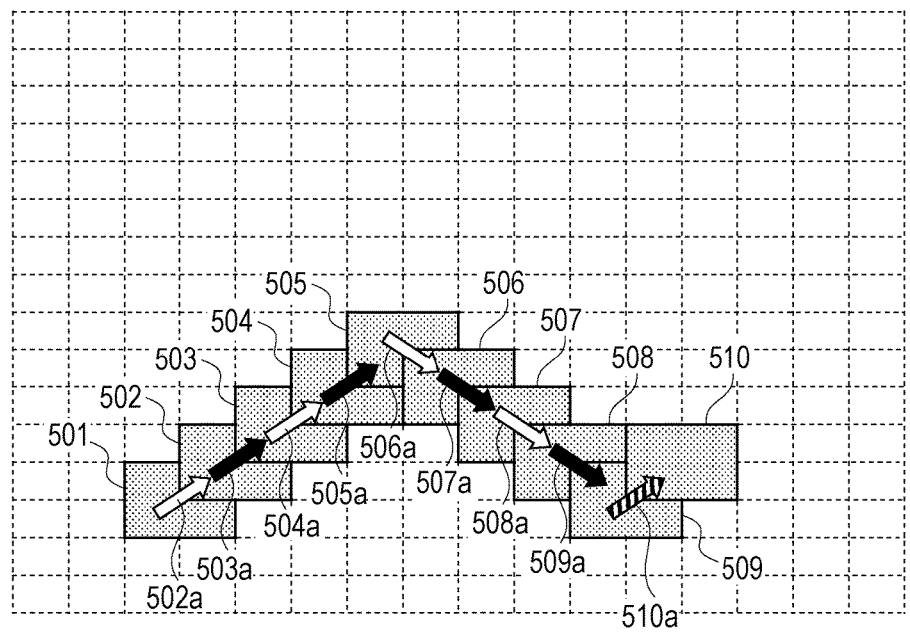
FIGS. 14A and 14B are diagrams explaining processing in which the transmission control unit matches data at a predetermined breakpoint.
Figure 14B:
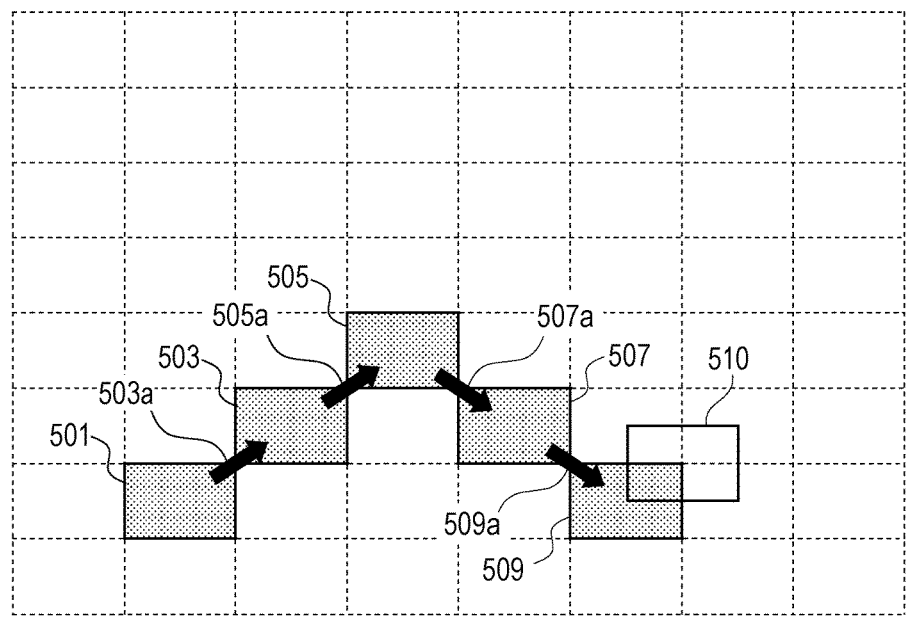

In addition, if the transmission data is got rid of by the processing of FIG. 9, the transmission control unit 16 of the information processing apparatus 10-1 may transmit the changed data at a breakpoint of manipulation from the user to the information processing apparatus 10 to be processed regardless of the utilization granularity. FIGS. 14A and 14B are diagrams explaining the processing in which the transmission control unit 16 matches data at a predetermined breakpoint. For example, suppose that the position of a particular window in the information processing apparatus 10-1 has changed from 501 to 510 along arrows 502*a* to 510*a* due to the manipulation of the user, as illustrated in FIG. 14A. In this case, as in the case of FIG. 10B, in the information processing apparatus 10-2 having the value of the ratio of utilization granularity "2", the position of the particular window changes as positions 501, 503, 505, 507, and 509 along arrows 503*a*, 505*a*, 507*a*, and 509*a*, as illustrated in FIG. 14B. Meanwhile, the information processing apparatus 10-2 displays the position of the particular window at position 509 and on the other hand stores the position of the particular window as being at position 510 in shared data storage unit 112. This makes it possible to reduce the risk of mismatch of data shared by the information processing apparatuses 10 in the case of, for example, sharing screen data among the information processing apparatuses 10 by use of a coordinate system taking as a reference the resolution of one information processing apparatus 10 which has a large screen and a high-resolution display installed on a wall. In addition, it is possible to reduce the risk of mismatch of data between the information processing apparatus 10-1 and the information processing apparatus 10-3 if, for example, the information processing apparatus 10-2 is to transmit the screen data received from the information processing apparatus 10-1 to the information processing apparatus 10-3.

Note that in this case, if changed data is not transmitted for a continuous period of time after changed data is transmitted, the transmission control unit 16 of the information processing apparatus 10-1 may transmit untransmitted changed data instead of transmitting changed data at a breakpoint of manipulation regardless of the utilization granularity when, for example, the application of the information processing apparatus 10-1 is terminated, when the information processing apparatus 10-1 is shut down, or when a notification on application termination is received from any of the information processing apparatuses 10-2 sharing the screen.

[Second Embodiment]

In the second embodiment, a description is provided for an example of predicting the change in shared data, and getting rid of transmission data on the transmission side and complementing data according to the change in the predicted shared data. Note that second embodiment is partially the same as the first embodiment and thus explanation is omitted as appropriate. In the following description, explanation of the parts common to the first embodiment is omitted. Description is only provided for different parts.

<Functional Configuration>

Figure 15:
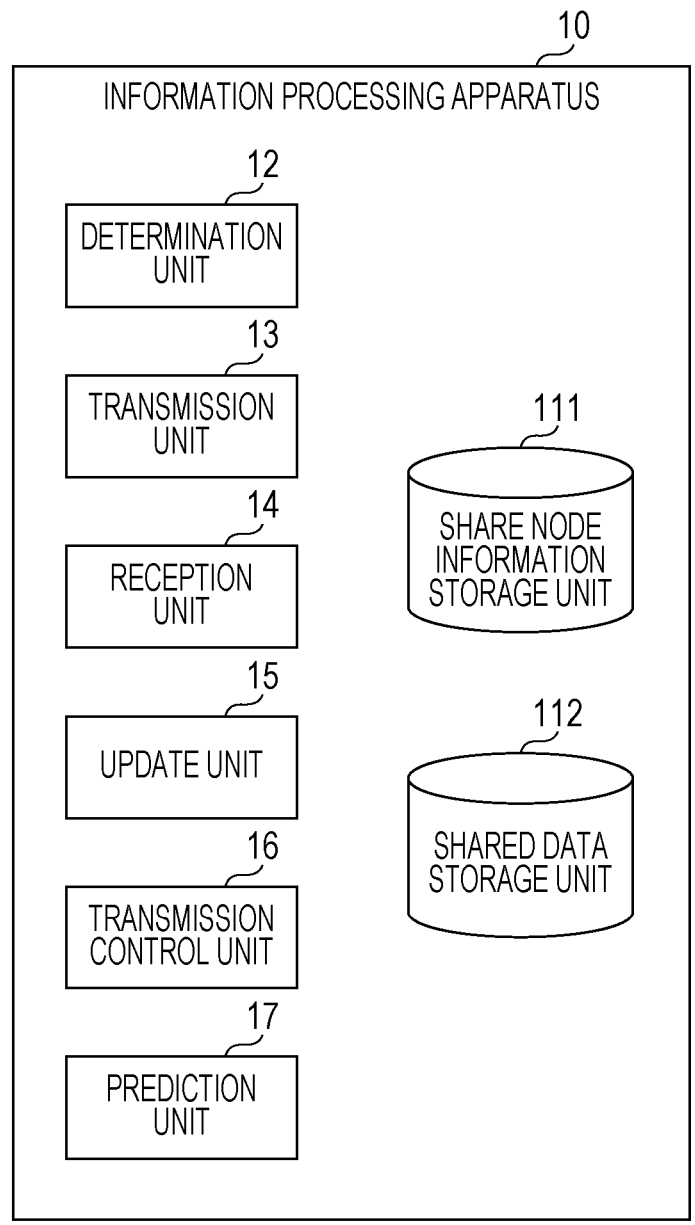
FIG. 15 is a diagram illustrating a functional block diagram of an information processing apparatus according to a second embodiment.

Next, with reference to FIG. 15, a description is provided for the functional configuration of the information processing apparatus 10. FIG. 15 is a diagram illustrating a functional block diagram of the information processing apparatus 10 according to the second embodiment. The information processing apparatus 10 further includes a prediction unit 17. The prediction unit 17 functions when one or more programs installed in the information processing apparatus 10 cause the CPU 104 of the information processing apparatus 10 to execute processing.

If the change in shared data is predictable, the transmission control unit 16 according to the second embodiment notifies the other information processing apparatuses 10 sharing the screen of that fact.

In addition, if the change in shared data according to the manipulation of the user is stopped, for example, the transmission control unit 16 notifies the other information processing apparatuses 10 sharing the screen of that fact.

When the prediction unit 17 receives a notification from the other information processing apparatuses 10 sharing the screen that the change in shared data is predictable, the prediction unit 17 predicts the change in shared data based on the already received changed data.

<Processing>

Figure 16:
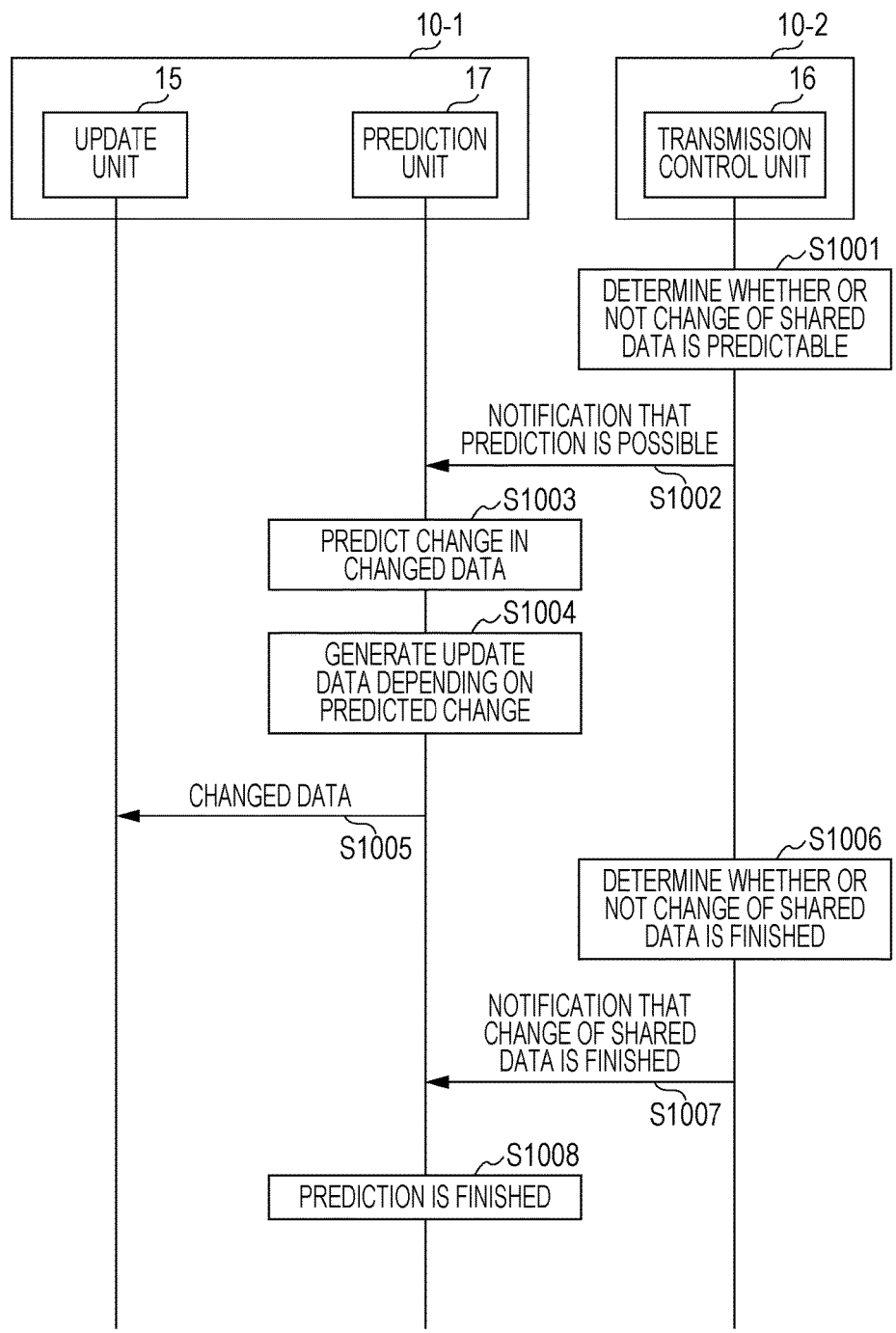
FIG. 16 is a sequence diagram illustrating an example of processing by an information processing system according to the second embodiment.

Next, with reference to FIG. 16, a description is provided for the processing by the information processing system 1 according to the second embodiment. FIG. 16 is a sequence diagram illustrating an example of processing by the information processing system 1 according to the second embodiment.

At step S1001, the transmission control unit 16 of the information processing apparatus 10-2 determines whether or not the change in shared data is predictable. Here, for example, the transmission control unit 16 of the information processing apparatus 10-2 determines whether or not it is presumable that a particular window continuously moves in a certain direction in response to the manipulation of the user.

Subsequently, if it is determined that the change is predictable, the transmission control unit 16 of the information processing apparatus 10-2 transmits a notification of that fact to the prediction unit 17 of the information processing apparatus 10-1 (step S1002).

Subsequently, the prediction unit 17 of the information processing apparatus 10-1 predicts the change in changed data based on the changed data received from the information processing apparatus 10-2 (step S1003). The prediction unit 17 calculates the difference between the position and the time of a particular window in the changed data received last time but one and the position and the time of the particular window in the changed data received previously and makes a prediction when the particular window moves by the time interval corresponding to the difference and by the distance corresponding to the difference.

Subsequently, the prediction unit 17 of the information processing apparatus 10-1 generates (complements) changed data depending on the predicted change (step S1004) and transmits the changed data to the update unit 15 of the information processing apparatus 10-1 (step S1005). This updates the screen information stored in the shared data storage unit 112 and the shared screen after update is displayed on the screen.

Subsequently, the transmission control unit 16 of the information processing apparatus 10-2 determines whether or not the change of the shared data is finished (step S1006).

When the transmission control unit 16 of the information processing apparatus 10-2 determines that the change of the shared data is finished, the transmission control unit 16 of the information processing apparatus 10-2 transmits a notification to the prediction unit 17 of the information processing apparatus 10-1 that the change of the shared data is finished (step S1007). Here, if the movement of the particular window in response to the manipulation of the user stops, for example, the transmission control unit 16 notifies of that fact.

Subsequently, the prediction unit 17 of the information processing apparatus 10-1 finishes the processing of predicting the change of updated data (step S1008).

This makes it possible to get rid of the transmission of the changed data being changed.

<<Modified Example of Prediction>>

The prediction unit 17 of the information processing apparatus 10-2 on the transmission side may calculate the difference instead of the prediction unit 17 of the information processing apparatus 10-1 on the reception side calculating the difference based on the received changed data. In this case, the prediction unit 17 of the information processing apparatus 10-2 may notify the prediction unit 17 of the information processing apparatus 10-1 of the data on the calculated difference. Alternatively, the prediction unit 17 of the information processing apparatus 10-2 on the transmission side may predict the change pattern and notify the prediction unit 17 of the information processing apparatus 10-1 of the predicted change pattern.

<<Modified Example of Processing by Transmission Control Unit 16>>

The transmission control unit 16 of the information processing apparatus 10-1 may determine whether or not the change of shared data at step S1001 is predictable if the load on the network among the information processing apparatuses 10 is equal to or more than a predetermined threshold or if the processing load on the CPU 104 of the information processing apparatus 10-1 configured to transmit shared data is less than a predetermined threshold. To be more specific, if the load on the network among the information processing apparatuses 10 is less than a predetermined threshold or if the processing load on the CPU 104 of the information processing apparatus 10-1 configured to transmit shared data is equal to or more than a predetermined threshold, determination as to predictableness is not made, and changed data got rid of by the same processing as in the first embodiment or all changed data is transmitted.

Alternatively, the transmission control unit 16 of the information processing apparatus 10-1 dynamically acquires the degree of calculation capability of the other information processing apparatuses 10 (performance of the CPU) and the processing load on the CPU. If the reserve calculation capability of the information processing apparatus 10 being the transmission destination is less than a predetermined threshold, the changed data may be transmitted instead of performing ridding processing based on the prediction on the change of shared data. In this case, if the transmission control unit 16 of the information processing apparatus 10-1 determines that the cost of communications is lower than the cost of complement processing by prediction based on the load on the network among the information processing apparatuses 10 being the transmission destinations and the reserve calculation capability of the information processing apparatuses 10 being the transmission destinations, the transmission control unit 16 of the information processing apparatus 10-1 may transmit the changed data instead of performing ridding processing based on the prediction on the change of shared data.

MODIFIED EXAMPLE

The embodiments described above dealt with an example of getting rid of transmission data depending on the resolution in the case of sharing a screen. For example, the disclosed technique is applicable to the embodiments as follows:

Sharing of sensor data among an information processing apparatus 10-1 having a sensor capable of measurement after the decimal point and information processing apparatuses 10 (e.g., information processing apparatus 10-2) having an application which enables simple graphing in units of integer.

Sharing of position data among an information processing apparatus 10-1 which has an application to display the current positions of multiple users on a map and displays approximate positions in a mode of travelling automobile, and information processing apparatuses 10-2, . . . which have the application and displays relatively precise position in a mode of travelling on foot.

Sharing of data among an information processing apparatus 10-1 having a display capable of dealing with color information in a detailed manner and information processing apparatus 10 (e.g., information processing apparatus 10-2) having a monochrome display.

The examples of the disclosure have been described above. The disclosure is not limited to those particular embodiments and is capable of various changes and modifications within the gist of the disclosure described in the scope of claims.

The functional parts of the information processing apparatus 10 may be realized by, for example, cloud computing including one or more computers. Note that the prediction unit 17 is an example of the "generating unit".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus which transmits data to one or more different information processing apparatuses, the information processing apparatus comprising:
a memory, and
a processor configured to perform a process comprising:
receiving a granularity capable of expressing a change of the data to be displayed in the one or more different information processing apparatuses, the granularity is a value based on a screen resolution at an area in which the data is displayed; and
when the data changes, transmitting the data after change to the one or more different information processing apparatuses according to the respective granularity received in the receiving, an extent of the change of the data, the screen resolution of the one or more different information processing apparatuses, and a screen resolution received in the receiving.

2. The information processing apparatus according to claim 1,
wherein the process further comprising:
determining the granularity of the information processing apparatus based on a type of the data transmitted to the one or more different information processing apparatuses, and
wherein in the receiving, the granularity of the one or more different information processing apparatus is received for each of the type of data transmitted.

3. The information processing apparatus according to claim 1, wherein in the transmitting, the data after the change is transmitted to the one or more different information processing apparatuses further according to when a load on the network between the information processing apparatus and the one or more different information processing apparatuses is greater than a first threshold or a processing load of the information processing apparatus is not greater than a second threshold.

4. The information processing apparatus according to claim 1,
wherein in the transmitting, the data at a breakpoint of manipulation of the information processing apparatus from a user is transmitted to the one or more different information processing apparatuses.

5. The information processing apparatus according to claim 1,
wherein in the transmitting, the data is transmitted in parallel to two or more of the different information processing apparatuses, if granularities received from the two or more of the different information processing apparatuses are the same.

6. The information processing apparatus according to claim 1,
wherein in the transmitting, in case the change of the data is predictable, that fact is notified to the one or more different information processing apparatuses, without transmitting the data to the one or more different information processing apparatuses during a period in which the change is predictable.

7. The information processing apparatus according to claim 6,
wherein in the transmitting, the fact that the change is predictable is not notified to the one or more different information processing apparatuses, when a load on the network between the information processing apparatus and the one or more different information processing apparatuses is greater than a first threshold or a processing load of the information processing apparatus is not greater than a second threshold.

8. An information processing apparatus which receives data from a different information processing apparatus, the information processing apparatus comprising:
a memory, and
a processor configured to perform a process comprising:
transmitting a granularity capable of expressing a change of the data to be displayed to the different information processing apparatus, the granularity is a value based on a screen resolution at an area in which the data is displayed; and
when the data changes, receiving the data after change from the different information processing apparatus according to the granularity, an extent of the change of the data, and the screen resolution of the different information processing apparatus.

9. An information processing system including a first information processing apparatus and a second information processing apparatus transmitting data to the first information processing apparatus,
wherein the first information processing apparatus comprising:
a first memory, and
a first processor configured to perform a first process comprising:
transmitting a granularity capable of expressing a change of the data in the first information processing apparatus to the second information processing apparatus, the granularity is a value based on a screen resolution at an area in which the data is displayed; and
updating data to be displayed on a display screen, based on the data received from the second information processing apparatus, and
wherein the second information processing apparatus comprising:
a second memory, and
a second processor configured to perform a second process comprising:
receiving the granularity, and
when the data changes, transmitting the data after change to the first information processing apparatus according to the granularity received in the receiving, an extent of the change of the data, and a screen resolution of the second information processing apparatus.

10. An information processing method executed by an information processing apparatus which transmits data to a different information processing apparatus, the method comprising:
receiving a granularity capable of expressing a change of the data to be displayed in the different information processing apparatus, the granularity is a value based on a screen resolution at an area in which the data is displayed; and
when the data changes, transmitting the data after change to the different information processing apparatus according to the granularity received in the receiving, an extent of the change of the data, the screen resolution of the different information processing apparatuses, and a screen resolution received in the receiving.

11. An information processing system comprising:
a first information processing device configured to
determine a utilization granularity indicating a granularity capable of expressing a change in data displayed on a first display physically connected to a first information processing device,
determine a change in the data displayed on the first display,
retrieve, from a memory of the first information processing device, data indicating a granularity of a second display physically connected to a second information processing device, the second display, simultaneously with the first display, displaying the data prior to the change,
calculate a difference between the data displayed on the first display subsequent to the change and prior to the change,
calculate a ratio between the utilization granularity and the granularity of the second display,
transmit, to the second information processing device, data indicating the change in the data displayed on the first display when the difference is equal to or greater than the ratio; and
the second information processing apparatus configured to
receive, from the first information processing device, the data indicating the change in the data displayed on the first display; and
update, based on the received data, the data displayed on the second display.

12. The information processing system according to claim 11,
wherein the utilization granularity is based on a display resolution of the first display and the granularity of the second display is based on a display resolution of the second display, and wherein the difference is based on a number of pixels related to the change.

\* \* \* \* \*